United States Patent
Wu et al.

(10) Patent No.: US 11,960,416 B2
(45) Date of Patent: Apr. 16, 2024

(54) MULTICHANNEL MEMORY ARBITRATION AND INTERLEAVING SCHEME

(71) Applicant: TEXAS INSTRUMENTS INCORPORATED, Dallas, TX (US)

(72) Inventors: Daniel Brad Wu, Plano, TX (US); Abhishek Shankar, Sugar Land, TX (US); Mihir Narendra Mody, Bengaluru (IN); Gregory Raymond Shurtz, Houston, TX (US); Jason A. T. Jones, Richmond, TX (US); Hemant Vijay Kumar Hariyani, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 107 days.

(21) Appl. No.: 17/558,278

(22) Filed: Dec. 21, 2021

(65) Prior Publication Data

US 2023/0195658 A1 Jun. 22, 2023

(51) Int. Cl.
*G06F 13/16* (2006.01)
(52) U.S. Cl.
CPC .................... *G06F 13/1647* (2013.01)
(58) Field of Classification Search
CPC .................................................. G06F 13/1647
See application file for complete search history.

(56) References Cited

U.S. PATENT DOCUMENTS

| | | | | |
|---|---|---|---|---|
| 9,417,684 B2* | 8/2016 | Ramage | ................ | G06F 1/3275 |
| 2007/0011396 A1* | 1/2007 | Singh | .................. | G06F 13/4059 |
| | | | | 711/105 |
| 2017/0255398 A1* | 9/2017 | Niu | ........................ | G06F 3/0656 |
| 2019/0043593 A1* | 2/2019 | Guo | ........................ | G11C 16/30 |
| 2022/0317923 A1* | 10/2022 | Balakrishnan | ........ | G06F 3/0679 |
| 2023/0102680 A1* | 3/2023 | Kanayama | ............ | G06F 3/0622 |
| | | | | 711/154 |

* cited by examiner

*Primary Examiner* — Henry Tsai
*Assistant Examiner* — Aurangzeb Hassan
(74) *Attorney, Agent, or Firm* — Michael T. Gabrik; Frank D. Cimino

(57) ABSTRACT

Techniques including a memory controller with a set of memory channel queues, wherein memory channel queues of the set of memory channel queues correspond to memory channels to access a set of memory modules, a first arbitration module, and a second arbitration module. The memory controller is configured to receive a first memory request from the peripheral and place one or more portions of the first memory request in the memory channel queues of the set of memory channel queues. The first arbitration module is configured to determine an arbitration algorithm, select a first memory channel queue based on the arbitration algorithm, present the one or more portions of the first memory request in the selected first memory channel queue to the second arbitration module, and output the presented one or more portions of the first memory request based on a selection by the second arbitration module.

20 Claims, 6 Drawing Sheets

MULTICHANNEL MEMORY ARBITRATION AND INTERLEAVING SCHEME

BACKGROUND

High performance computing has taken on even greater importance with the advent of the Internet and cloud computing. To ensure the responsiveness of networks, online processing nodes and storage systems must have extremely robust processing capabilities and exceedingly fast data-throughput rates. Robotics, medical imaging systems, visual inspection systems, electronic test equipment, and high-performance wireless and communication systems, for example, must be able to process an extremely large volume of data with a high degree of precision. A multi-core architecture example that includes aspects of the present disclosure will be described herein. In a typically example, a multi-core system is implemented as a single system on chip (SoC).

Often SoC are coupled to a set of external memory modules via a set of memory channels. The SoC may access these external memory modules to store and retrieve information. To help avoid bottlenecks accessing the external memory modules, a load on the memory channels and external memory modules may be managed to distribute the load across multiple memory channels and memory modules. Memory access arbitration can help manage this load.

SUMMARY

This disclosure relates to techniques for memory management. More particularly, but not by way of limitation, aspects of the present disclosure relate a device, including a set of memory modules accessible via a set of memory channels, a memory controller, and a peripheral coupled to the set of memory modules via the memory controller. The memory controller includes a set of memory channel queues, wherein memory channel queues of the set of memory channel queues correspond to memory channels to access the set of memory modules. The memory control also includes a first arbitration module and a second arbitration module. The memory controller is configured to receive memory requests from the peripheral. The memory controller is also configured to place one or more portions of the received memory requests in the memory channel queues of the set of memory channel queues. The arbitration module is configured to determine an arbitration algorithm. The arbitration module is also configured to select a memory channel queue based on the arbitration algorithm. The arbitration module is further configured to present the one or more portions of the received memory requests in the selected memory channel queue to the second arbitration module. The arbitration module is also configured to output the presented one or more portions of the received memory requests based on a selection by the second arbitration module.

Another aspect of the present disclosure relates to a method for memory management. The method includes receiving a memory request from a peripheral. The method further includes placing one or more portions of the received memory request in a memory channel queue of a set of memory channel queues associated with the peripheral. The method also includes selecting the memory channel queue based on an arbitration algorithm. The method further includes presenting the one or more portions of the received memory request in the selected memory channel queue to a second arbitration module for selection by the second arbitration module. The method further includes outputting the presented one or more portions of the received memory requests based on the selection by the second arbitration module.

Another aspect of the present disclosure relates to a memory controller. The memory controller includes a set of memory channel queues, wherein memory channel queues of the set of memory channel queues correspond to memory channels to access a set of memory modules, and wherein the set of memory channel queues are associated with a peripheral. The memory controller further includes a first arbitration module and a second arbitration module. The memory controller is configured to receive a first memory request from the peripheral. The memory controller is also configured to place one or more portions of the first memory request in the memory channel queues of the set of memory channel queues. The first arbitration module is configured to determine an arbitration algorithm. The first arbitration module is further configured to select a first memory channel queue based on the arbitration algorithm. The first arbitration module is also configured to present the one or more portions of the first memory request in the selected first memory channel queue to the second arbitration module. The first arbitration module is further configured to output the presented one or more portions of the first memory request based on a selection by the second arbitration module.

BRIEF DESCRIPTION OF THE DRAWINGS

For a detailed description of various examples, reference will now be made to the accompanying drawings in which.

The same reference number is used in the drawings for the same or similar (either by function and/or structure) features.

DETAILED DESCRIPTION

Figure 1:
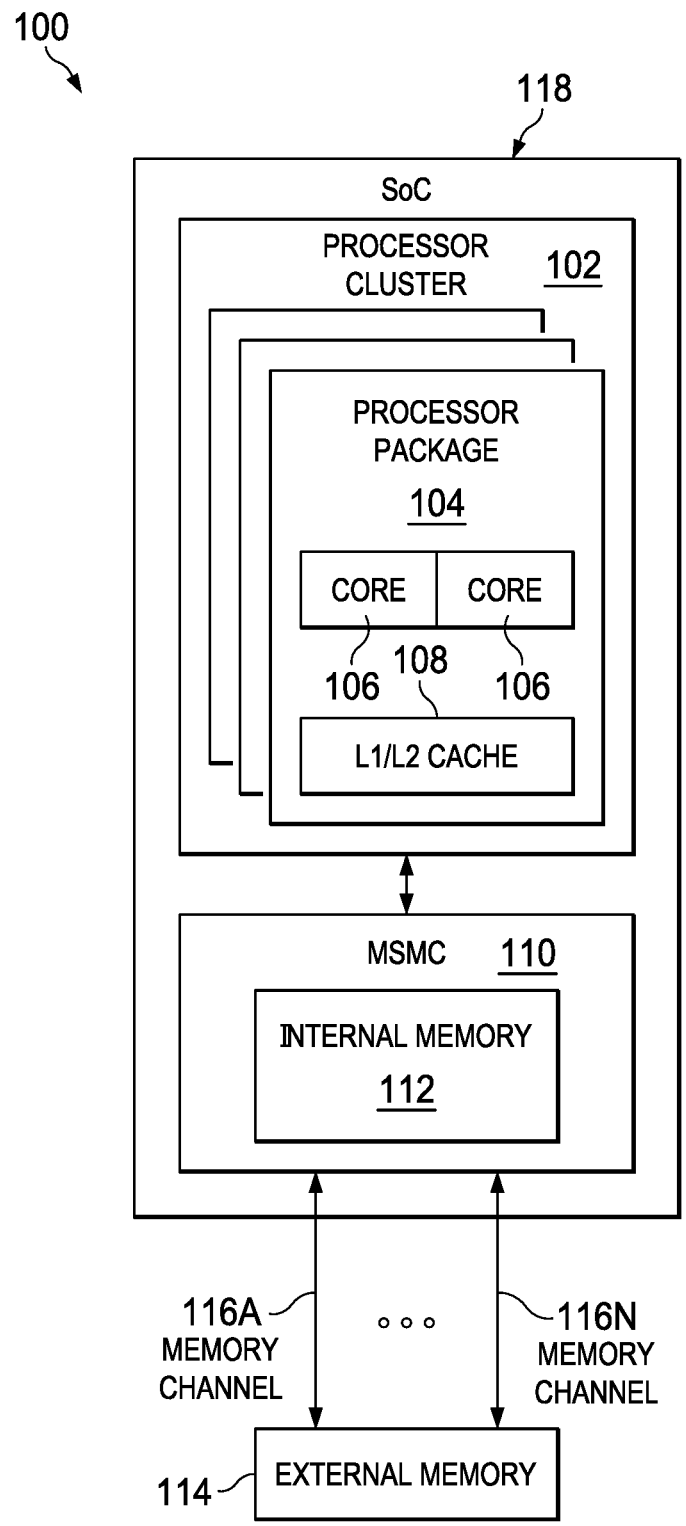
FIG. 1 illustrates a multi-core processing system, in accordance with aspects of the present disclosure.

FIG. 1 is a functional block diagram of a multi-core processing system 100, in accordance with aspects of the present disclosure. System 100 is a multi-core SoC 118 that includes a processing cluster 102 including one or more processor packages 104. The one or more processor packages 104 may include one or more types of processors, such as a central processing unit (CPU), graphical processing unit (GPU), digital signal processor (DSP), etc. As an example, a processing cluster 102 may include a set of processor packages split between DSP, CPU, and GPU processor packages. Each processor package 104 may include one or more processing cores 106. As used herein, the term "core" refers to a processing module that may contain an instruction processor, such as a digital signal processor (DSP) or other type of microprocessor. Each processor package also contains one or more caches 108. These caches 108 may include one or more L1 caches and one or more L2 caches. For example, a processor package 104 may include four cores, each core including an L1 data cache and L1 instruction cache, along with an L2 cache shared by the four cores.

The multi-core processing system 100 also includes a MSMC 110, through which it is connected one or more external memories 114 and input/output direct memory access channels 116. The MSMC 110 also includes an on-chip internal memory 112 system which is directly managed by the MSMC 110. In certain embodiments, the MSMC 110 helps manage traffic between multiple processor cores, other mastering peripherals, or direct memory access (DMA) and allows processor packages 104 to dynamically share the internal and external memories for both program instructions and data. The MSMC 110 is coupled to an external memory 114 (e.g., double data rate (DDR) memory, low power DDR memory, etc.) via a set of memory channels 116A-116N (collectively 116). The MSMC 110 helps provide a flat memory model across the memory channels 116 and external memory 114. This flat memory model presents the external memory 114 as a single logical memory address space to software executing on the multi-core processing system 100. External memory 114 may be connected through the MSMC 110 along with the internal memory 112 via a memory interface (not shown).

Figure 2:
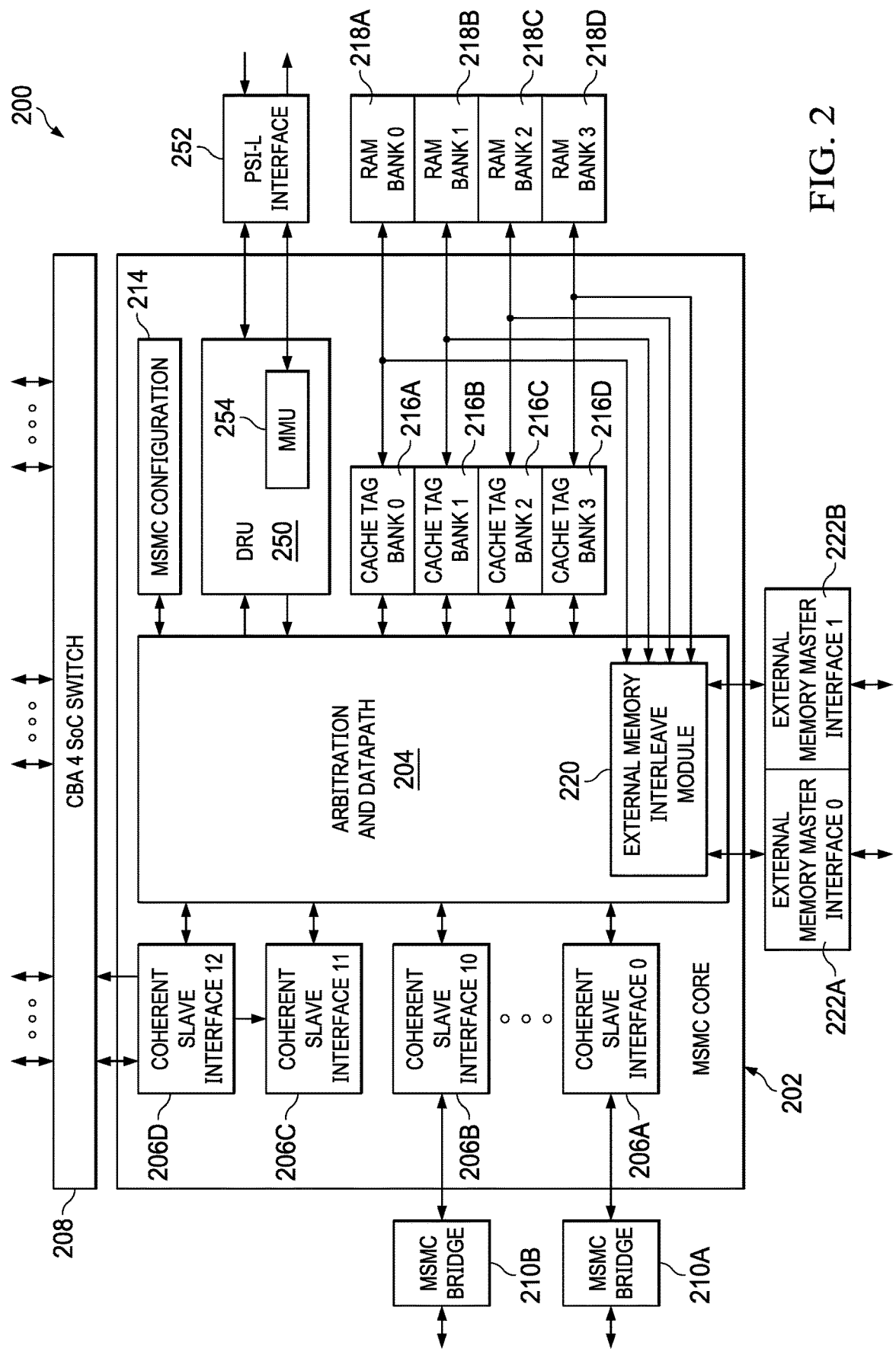
FIG. 2 is a functional block diagram of a multi-core shared memory controller (MSMC), in accordance with aspects of the present disclosure.

FIG. 2 is a functional block diagram of a MSMC 200, in accordance with aspects of the present disclosure. The MSMC 200 includes a MSMC core logic 202, defining the primary logic circuits of the MSMC. The MSMC 200 is configured to provide an interconnect between master peripherals (e.g., devices that access memory, such as processors, processor packages, direct memory access/input output devices, etc.) and slave peripherals (e.g., memory devices, such as double data rate random access memory, other types of random access memory, direct memory access/input output devices, etc.). The master peripherals may or may not include caches. The MSMC 200 is configured to provide hardware-based memory coherency between master peripherals connected to the MSMC 200 even in cases in which the master peripherals include their own caches. The MSMC 200 may further provide a coherent level 3 cache accessible to the master peripherals and/or additional memory space (e.g., scratch pad memory) accessible to the master peripherals.

The MSMC core 202 includes a plurality of coherent slave interfaces 206A-D. While in the illustrated example, the MSMC core 202 includes thirteen coherent slave interfaces 202 (only four are shown for conciseness), other implementations of the MSMC core 202 may include a different number of coherent slave interfaces 206. Each of the coherent slave interfaces 206A-D is configured to connect to one or more corresponding master peripherals. For example, master peripherals include a processor, a processor package, a direct memory access device, an input/output device, etc. Each of the coherent slave interfaces 206 is configured to transmit data and instructions between the corresponding master peripheral and the MSMC core 202. For example, the first coherent slave interface 206A may receive a read request from a master peripheral connected to the first coherent slave interface 206A and relay the read request to other components of the MSMC core 202. Further, the first coherent slave interface 206A may transmit a response to the read request from the MSMC core 202 to the master peripheral. In some implementations, the coherent slave interfaces 206 correspond to 512-bit or 256-bit interfaces and support 48-bit physical addressing of memory locations.

In the illustrated example, a thirteenth coherent slave interface 206D is connected to a common bus architecture (CBA) system on chip (SOC) switch 208. The CBA SOC switch 208 may be connected to a plurality of master peripherals and be configured to provide a switched connection between the plurality of master peripherals and the MSMC core 202. While not illustrated, additional ones of the coherent slave interfaces 206 may be connected to a corresponding CBA. Alternatively, in some implementations, none of the coherent slave interfaces 206 is connected to a CBA SOC switch.

In some implementations, one or more of the coherent slave interfaces 206 interfaces with the corresponding master peripheral through a MSMC bridge a configured to provide one or more translation services between the master peripheral connected to the MSMC bridge 210 and the MSMC core 202. For example, ARM v7 and v8 devices utilizing the AXI/ACE and/or the Skyros protocols may be connected to the MSMC 200, while the MSMC core 202 may be configured to operate according to a coherent streaming credit-based protocol, such as multi-core bus architecture (MBA). The MSMC bridge 210 helps convert between the various protocols, to provide bus width conversion, clock conversion, voltage conversion, or a combination thereof. In addition, or in the alternative to such translation services, the MSMC bridge 210 may provide cache prewarming support via an Accelerator Coherency Port (ACP) interface for accessing a cache memory of a coupled master peripheral and data error correcting code (ECC) detection and generation. In the illustrated example, the first coherent slave interface 206A is connected to a first MSMC bridge 210A and an eleventh coherent slave interface 210B is connected to a second MSMC bridge 210B. In other examples, more or fewer (e.g., 0) of the coherent slave interfaces 206 are connected to a corresponding MSMC bridge.

The MSMC core logic 202 includes an arbitration and data path manager 204. The arbitration and data path manager 204 includes a data path (e.g., a collection of wires, traces, other conductive elements, etc.) between the coherent slave interfaces 206 and other components of the MSMC core logic 202. The arbitration and data path manager 204 further includes logic configured to establish virtual channels between components of the MSMC 200 over shared physical connections (e.g., the data path). In addition, the arbitration and data path manager 204 is configured to arbitrate access to these virtual channels over the shared physical connections. Using virtual channels over shared physical connections within the MSMC 200 may reduce a number of connections and an amount of wiring used within the MSMC 200 as compared to implementations that rely on a crossbar switch for connectivity between components. In some implementations, the arbitration and data path 204 includes hardware logic configured to perform the arbitration operations described herein. In alternative examples, the arbitration and data path 204 includes a processing device configured to execute instructions (e.g., stored in a memory of the arbitration and data path 204) to perform the arbitration operations described herein. As described further herein, additional components of the MSMC 200 may include arbitration logic (e.g., hardware configured to perform arbitration operations, a processor configure to execute arbitration instructions, or a combination thereof). The arbitration and data path 204 may select an arbitration winner to place on the shared physical connections from among a plurality of requests (e.g., read requests, write requests, snoop requests, etc.) based on a priority level associated with a requestor, based on a fair-share or round robin fairness level, based on a starvation indicator, or a combination thereof.

The arbitration and data path 204 further includes a coherency controller 224. The coherency controller 224 includes a snoop filter 212. The snoop filter 212 is a hardware unit that stores information indicating which (if any) of the master peripherals stores data associated with lines of memory of memory devices connected to the MSMC 200. The coherency controller 224 is configured to maintain coherency of shared memory based on contents of the snoop filter 212.

The MSMC 200 further includes a MSMC configuration component 214 connected to the arbitration and data path 204. The MSMC configuration component 214 stores various configuration settings associated with the MSMC 200. In some implementations, the MSMC configuration component 214 includes additional arbitration logic (e.g., hardware arbitration logic, a processor configured to execute software arbitration logic, or a combination thereof).

The MSMC 200 further includes a plurality of cache tag banks 216. In the illustrated example, the MSMC 200 includes four cache tag banks 216A-D. In other implementations, the MSMC 200 includes a different number of cache tag banks 216 (e.g., 1 or more). The cache tag banks 216 are connected to the arbitration and data path 204. Each of the cache tag banks 216 is configured to store "tags" indicating memory locations in memory devices connected to the MSMC 200. Each entry in the snoop filter 212 corresponds to a corresponding one of the tags in the cache tag banks 216. Thus, each entry in the snoop filter indicates whether data associated with a particular memory location is stored in one of the master peripherals.

Each of the cache tag banks 216 is connected to a corresponding RAM bank 218. For example, a first cache tag bank 216A is connected to a first RAM bank 218A, etc. Each entry in the RAM banks 218 is associated with a corresponding entry in the cache tag banks 216 and a corresponding entry in the snoop filter 212. Entries in the RAM banks 218 may be used as an additional cache or as additional memory space based on a setting stored in the MSMC configuration component 214. The cache tag banks 216 and the RAM banks 218 may correspond to RAM modules (e.g., static RAM). While not illustrated in FIG. 2, the MSMC 200 may include read modify write queues connected to each of the RAM banks 218. These read modify write queues may include arbitration logic, buffers, or a combination thereof. The MSMC core 202 also includes a data routing unit (DRU) 250, which helps provide integrated address translation and cache prewarming functionality and is coupled to a packet streaming interface link (PSI-L) interface 252, which is a shared messaging interface to a system wide bus supporting DMA control messaging. The DRU includes an integrated DRU memory management unit (MMU) 254.

The MSMC 200 further includes an external memory interleave module 220 connected to the cache tag banks 216 and the RAM banks 218. One or more external memory master interfaces 222 are connected to the external memory interleave module 220. The external memory interfaces 222 are configured to connect to external memory devices (e.g., DDR devices, direct memory access input/output (DMA/IO) devices, etc.) and to exchange messages between the external memory devices and the MSMC 200. The external memory devices may include, for example, the external memories 114 of FIG. 1, the DMA/IO clients 116, of FIG. 1, or a combination thereof. The external memory interleave module 220 is configured to interleave or separate address spaces assigned to the external memory master interfaces 222 (e.g., memory channels). While two external memory master interfaces 222A-B (collectively 222) are shown, other implementations of the MSMC 200 may include a different number of external memory master interfaces 222. Several external memory master interfaces 222 may correspond to a number of memory modules (not shown).

The external memory interleave module 220 helps provide a flat memory model by mixing stripes of address ranges across the external memory master interfaces 222A-B. For example, an interleaving granularity size may be defined, such as during boot or dynamically defined, such as 128 bytes, 1 K byte, etc. A memory write with a size larger than the interleaving granularity size may be split across multiple external memory master interfaces 222, based on the interleaving granularity size. In this example, the external memory interleave module 220 and/or the MSMC 200 maps the flat logical memory addresses of the memory write to the physical memory addresses of the external memory. In some cases, separate external memory interleave modules 220 may be used for each mastering peripheral and/or coherent slave interface 206. In some cases, additional arbitration as across the external memory master interfaces 222 for the mastering peripherals by one or more external memory arbitration modules (not shown).

In some cases, the arbitration and data path manager 204 and/or and the external memory interleave module 220 may include one or more buffers (not shown) for temporarily storing memory requests received from a master peripheral and before being sent to an external memory via a memory channel. These buffers may receive memory requests from the master peripheral, determine which memory channel(s) to use for the memory request, and queue the memory requests until the corresponding memory channel is available. In some cases, there may be a substantial amount of time before the memory channel becomes available. For example, another peripheral may be accessing the memory, the memory may be performing a refresh cycle, opening/closing a page, etc. In cases where a first memory request is waiting for a first memory channel to become available, additional memory requests, including requests destined for other memory channels, queued in the buffers behind the first memory request may be blocked waiting for the first memory channel to clear. An improved multichannel memory arbitration and interleaving scheme may help alleviate this delay.

Figure 3:
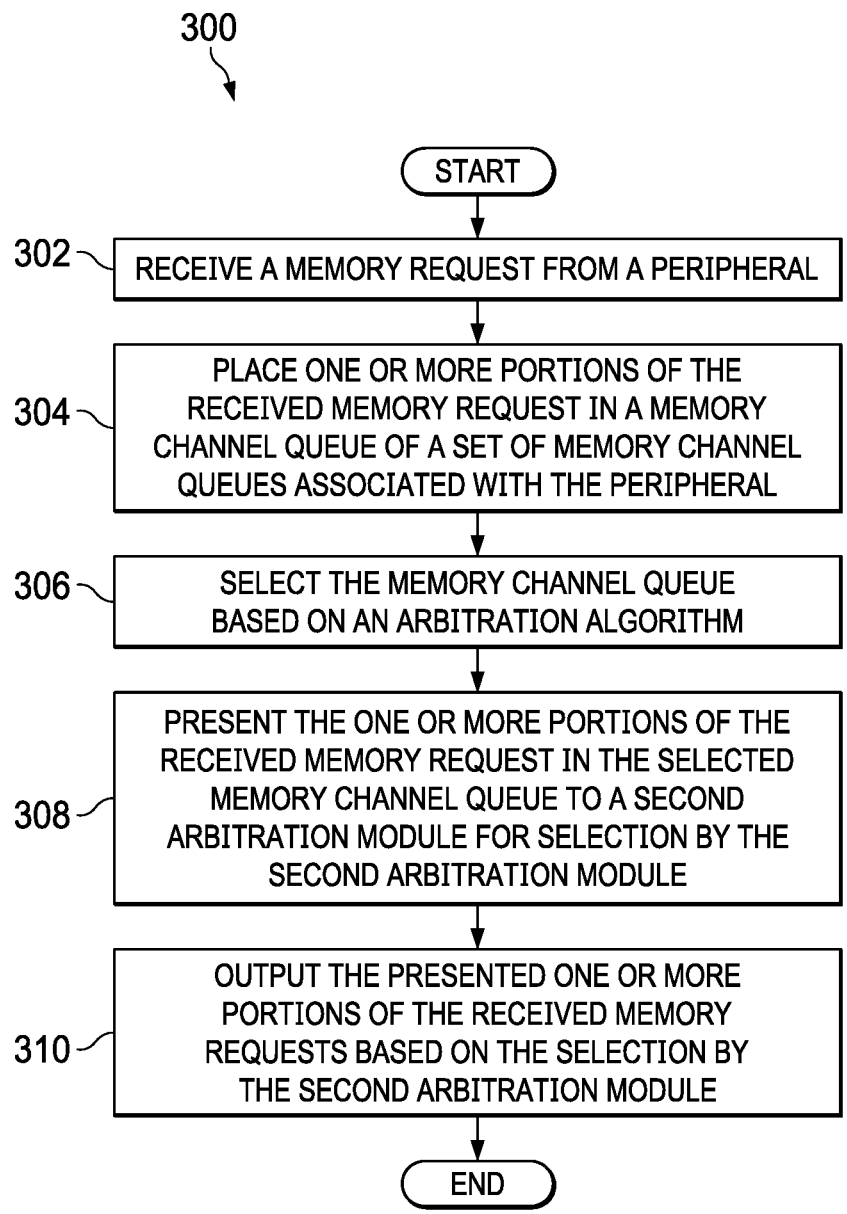
FIG. 3 is a flow diagram illustrating an improved multi-channel memory arbitration and interleaving scheme, in accordance with aspects of the present disclosure.

FIG. 3 is a flow diagram 300 illustrating an improved multichannel memory arbitration and interleaving scheme, in accordance with aspects of the present disclosure. At block 302, a memory request is received from a peripheral. For example, a peripheral may access external memory using memory requests transmitted by the peripheral to the external memory via a memory controller. At block 304, one or more portions of the received memory request are placed in a memory channel queue of a set of memory channel queues associated with the peripheral. For example, after the memory controller receives the memory request, the memory request may be interleaved and placed in a set of memory channel queues. The set of memory channel queues may be used to process memory requests from a particular peripheral and each memory channel queue of the set of memory channel queues may be associated with a particular memory channel/memory module. Each peripheral capable of providing a memory request may have its own separate and independent set of memory channel queues associated with the memory channels/modules. At block 306, the memory channel queue is selected based on an arbitration algorithm. For example, an arbitration process may select a memory channel queue of the set of memory channel queues and present the memory request at the head of the memory channel queue for arbitration by another arbitration process. In some cases, the arbitration algorithm selects a memory channel queue based on a load level of the memory channel associated with the set of memory channel queues and a length of time a portion of the received memory requests have been in a memory channel queue. In some cases, the arbitration algorithm to be applied may be determined. This determination may be based on a value stored in an arbitration control register. In some cases, determining the arbitration algorithm comprises selecting between a first arbitration algorithm and a second arbitration algorithm. In some cases, the first arbitration algorithm comprises a round-robin arbitration algorithm. In some cases, the presented memory request may be withdrawn if the presented memory request is not selected by the second arbitration module within a predetermined (e.g., threshold) number of clock cycles (e.g., amount of time, etc.). In some cases, the second arbitration algorithm selects a memory channel queue based on a set of factors. In some cases, the set of factors include a load level of the memory channel queues of the set of memory channel queues and a length of time a portion of the received memory requests have been in a memory channel queue. Accordingly, arbitration for a given peripheral may be performed on the memory channel queues associated with the given peripheral.

At block 308, the one or more portions of the received memory request in the selected memory channel queue are presented to a second arbitration module for selection by the second arbitration module. For example, a memory request at the head of the selected memory channel queue may be selected for presentation for a second arbitration process. This second arbitration process may arbitrate across memory requests from multiple peripherals being presented for a particular memory channel/memory module. At block 310, the presented one or more portions of the received memory request is output based on the selection by the second arbitration module.

Figure 4:
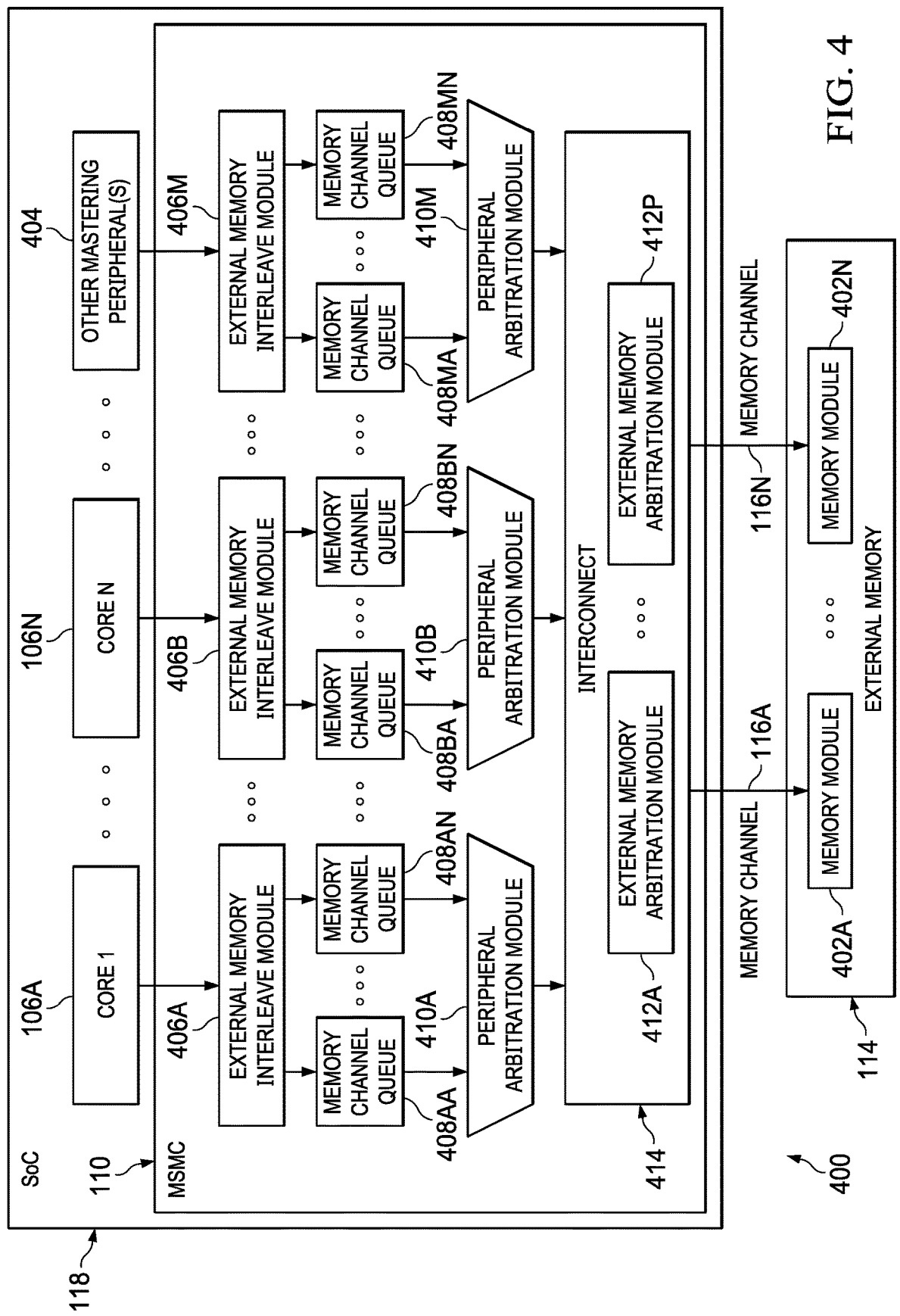
FIG. 4 is a block diagram of a multi-core processing system including an improved multichannel memory arbitration and interleaving circuit, in accordance with aspects of the present disclosure.

FIG. 4 is a block diagram of a multi-core processing system 400, including an improved multichannel memory arbitration and interleaving circuit, in accordance with aspects of the present disclosure. Similar to the system 100 of FIG. 1, multi-core processing system 400 includes a SoC 118. The SoC 118 may be coupled to an external memory 114. The external memory 114 includes a set of memory modules 402A . . . 402N (collectively 402), each coupled to the SoC via memory channels 116A . . . 116N (collectively 116). As an example, a memory module, such as memory module 402A, of the set of memory modules 402 may be a low-power DDR (LPDDR) module, the set of LPDDR modules may form the external memory 114, and the connection between the LPDDR modules to the SoC may form the memory channels 116.

The SoC 118 includes a set of processing cores 106A . . . 106N (collectively 106) that may be included among one or more processor packages 104 (not shown). The SoC 118 may also include one or more other mastering peripherals 404 which can access the external memory 114, such as via the MSMC 110. The external memory 114 includes a set of N memory modules 402A-402N (collectively 402). The number N of memory modules 402 is predetermined, for example, when the processing system 400 is designed.

The processing cores 106 and other mastering peripherals 404 are coupled to a set of external interleave modules 406A, 406B . . . 406M (collectively 406). In this example, each mastering peripheral (processing cores 106 and other mastering peripherals 404) is coupled via a corresponding external memory interleave module 406 to a set of memory channel queues collectively 408. For example, external memory interleave module 406A is coupled to a corresponding set of memory channel queues 408AA-408AN, external memory interleave module 406B is coupled to a corresponding set of memory channel queues 408BA-408BN, and so forth. It should be understood that in some examples, a single external memory interleave module 406 may be used. The external memory interleave module 406 may be substantially similar to external memory interleave module 220 of FIG. 2 and may assign and/or divide external memory writes across the memory modules 402.

After the memory writes are assigned to a memory module (and corresponding memory channel) of the memory modules 402, the memory writes may be stored in a memory channel queue corresponding with the assigned memory module, such as memory channel queue 408A, of the set of memory channel queues 408. It should be understood that while the above example describes a write request, other memory access requests, such as read requests, may be handled in a substantially similar manner. For example, a read request may be mapped to a specific memory module, such as memory module 402A, and the external memory interleave module 406 may store the read request to a memory channel queue 408A corresponding to the memory module 402A.

As shown in this example, each mastering peripheral is coupled to its own independent and distinct set of N memory channel queues 408. In some cases, the set of memory channel queues 408, for each mastering peripheral, may match the number of memory modules N and each memory channel queue, of the set of memory channel queues 408, may correspond to a memory module of the set of memory modules 402. For example, memory writes for memory module 402N may be stored in memory channel queue 408N. In some cases, each mastering peripheral is coupled to the set of memory channel queues 408 sufficient for the external memory addressable by the corresponding mastering peripheral. For example, if a mastering peripheral is capable of addressing N−1 memory modules of the external memory, then that mastering peripheral may be coupled to a set of N−1 memory channel queues 408. Each set of memory channel queues 408 for a corresponding mastering peripheral may be coupled to a peripheral arbitration module 410A, 410B . . . 410N (collectively 410).

The peripheral arbitration modules 410 selects data (e.g., a pointer associated with a memory request) from the set of memory channel queues 408 for the corresponding mastering peripheral for presentation to one or more external memory arbitration modules 412A-412P (collectively 412) of the interconnect 414. The peripheral arbitration modules 410 helps load balance the memory access across the memory modules 402. For example, the peripheral arbitration modules 410 may detect that memory transactions with certain memory modules 410 are stalled and/or latent and allow other memory transactions with other memory modules 410 to proceed. In some cases, the peripheral arbitration modules 410 may be configured to load balance the memory access based on one or more arbitration algorithms. For example, the peripheral arbitration modules 410 may support a round-robin and counter based arbitration scheme along with an aging based arbitration scheme. After a memory request is selected by the peripheral arbitration module 410 corresponding to the mastering peripheral, the memory request is presented to the one or more external memory arbitration modules 412. In this example, each external memory module 402 is coupled to a separate external memory arbitration module 412. An external memory arbitration module 412, such as external memory arbitration module 412A, selects, for the corresponding memory module such as memory module 402A, from among the memory requests presented to the external memory arbitration module 412A by the peripheral arbitration modules 410. The one or more external memory arbitration modules may perform additional memory arbitration as among the set of the peripheral arbitration modules 410 to select from among the presented memory requests to send to the corresponding memory channel 116 and memory module 402. The external memory arbitration module 412 may apply different arbitration techniques as compared to the peripheral arbitration module 410. The external memory arbitration module 412 may apply any existing arbitration technique for selecting among the presented memory requests for the associated memory module. For example, the external memory arbitration module 412 may implement a credit based arbitration system where credits are made available for a memory channel when the memory channel, and corresponding memory module is relatively lightly loaded, and fewer credits are made available when the memory channel is relatively highly loaded.

Figure 5:
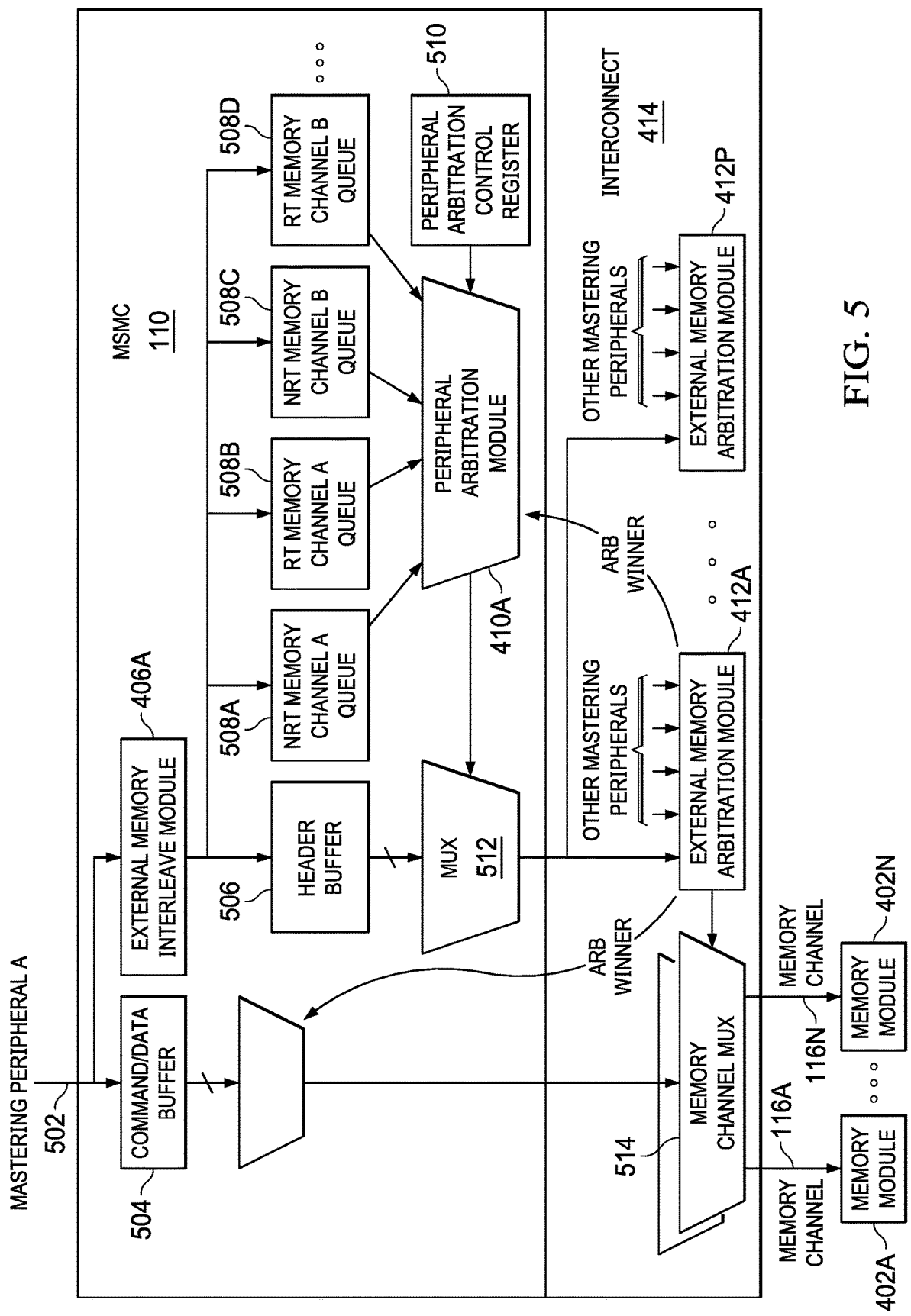
FIG. 5 is a block diagram of an example MSMC 110 implementing aspects of an improved multichannel memory arbitration and interleaving scheme, in accordance with aspects of the present disclosure.

FIG. 5 is a block diagram 500 of an example MSMC 110 implementing aspects of an improved multichannel memory arbitration and interleaving scheme, in accordance with aspects of the present disclosure. Diagram 500 illustrates components of an example MSMC 110 associated with a particular mastering peripheral, here mastering peripheral A 502. In some cases, memory requests from the mastering peripheral A 502 may include a header and a body. The header may include address information indicating a logical address for the memory request. The body may include commands for the memory request and/or data associated with the memory request. The body of memory requests may be stored in a command/data buffer 504 and associated headers may be processed by the external memory interleave module 406A to determine a target memory module 402 and corresponding memory channel 116, here memory module 402A and memory channel 116A, respectively. After the target memory module 402A and corresponding memory channel 116 have been determined, the header may be stored in a header buffer 506 and a pointer to the header may be stored in a memory channel queue corresponding to the target memory module 402A. In this example, the pointer to the header may be stored in a memory channel 1 non-real time (NRT) queue 508A. The memory channel queues 508 may be similar to the memory channel queues 408 of FIG. 4 except that multiple memory channel queues 508 may be associated with a memory module and memory channel.

In some cases, the memory channel queues 508 may include multiple memory channel queues associated with a single memory module 402 and memory channel 116. In MSMC 110, the memory channel queues 408 include multiple memory channel queues, here memory channel A NRT and real time (RT) queues 508A and 508B, for with a single memory module 402A based on a type of memory request received. In this example, memory requests may be associated with a RT process or NRT process, where RT processes are associated with strict timing requirements and may be prioritized. As an example, images captured by a video camera may be stored to a memory using a RT memory request as the video camera may capture images at a certain rate and each image should be stored to a memory within a certain amount of time to avoid a backlog of images and/or images that are not properly stored to the memory. When a memory request associated with an RT process is received, the external memory interleave module 406 may determine that the memory request associated with the RT process has been received and place the pointer to the header of the RT memory request in a RT memory channel queue, such as RT memory channel A queue 508B or RT memory channel B queue 508D in this example.

As RT memory requests may be prioritized, the peripheral arbitration module 410A may be configured to prioritized memory requests in the RT memory channel queues over the memory requests in the NRT memory channel queues when load balancing. In some cases, an arbitration algorithm applied by the peripheral arbitration module 410A may be selected. For example, the arbitration algorithm may be user selectable based on a value set in a peripheral arbitration control register 510. For example, the peripheral arbitration control register 510 may be a one-bit register that enables a user to toggle between two arbitration algorithm, such as a coarse balancing algorithm and a fine balancing algorithm. In some cases, the arbitration algorithm may be configured at boot time, or may be dynamically adjustable. In some cases, the peripheral arbitration control register 510 may be a memory mapped register of the MSMC 110 and/or SoC.

Based on the configured arbitration algorithm, the peripheral arbitration module 410A may arbitrate from among the memory channel queues for a memory request to present to an external memory arbitration modules 412 corresponding to the memory channel queue selected. For example, the peripheral arbitration module 410A may select a pointer representing a memory request for memory module 402A from the NRT memory channel A queue 508A for presentation for mastering peripheral A 502 to the external memory arbitration module 412 corresponding to memory module 402A, here external memory arbitration module 412A. The pointer may be used to select the associated header from the header buffer 506 by mux 512 for presentation. The external memory arbitration module 412 may arbitrate from among memory requests presented to the arbitration memory module 412A and any number of the other mastering peripherals also presenting memory requests to arbitration memory module 412A and corresponding memory module 402A. When the memory request presented by the peripheral arbitration module 410A is selected by arbitration by the external memory arbitration module 412A, the body of the memory request may be obtained via a memory channel mux 514 for transmission via memory channel 116A.

Figure 6:
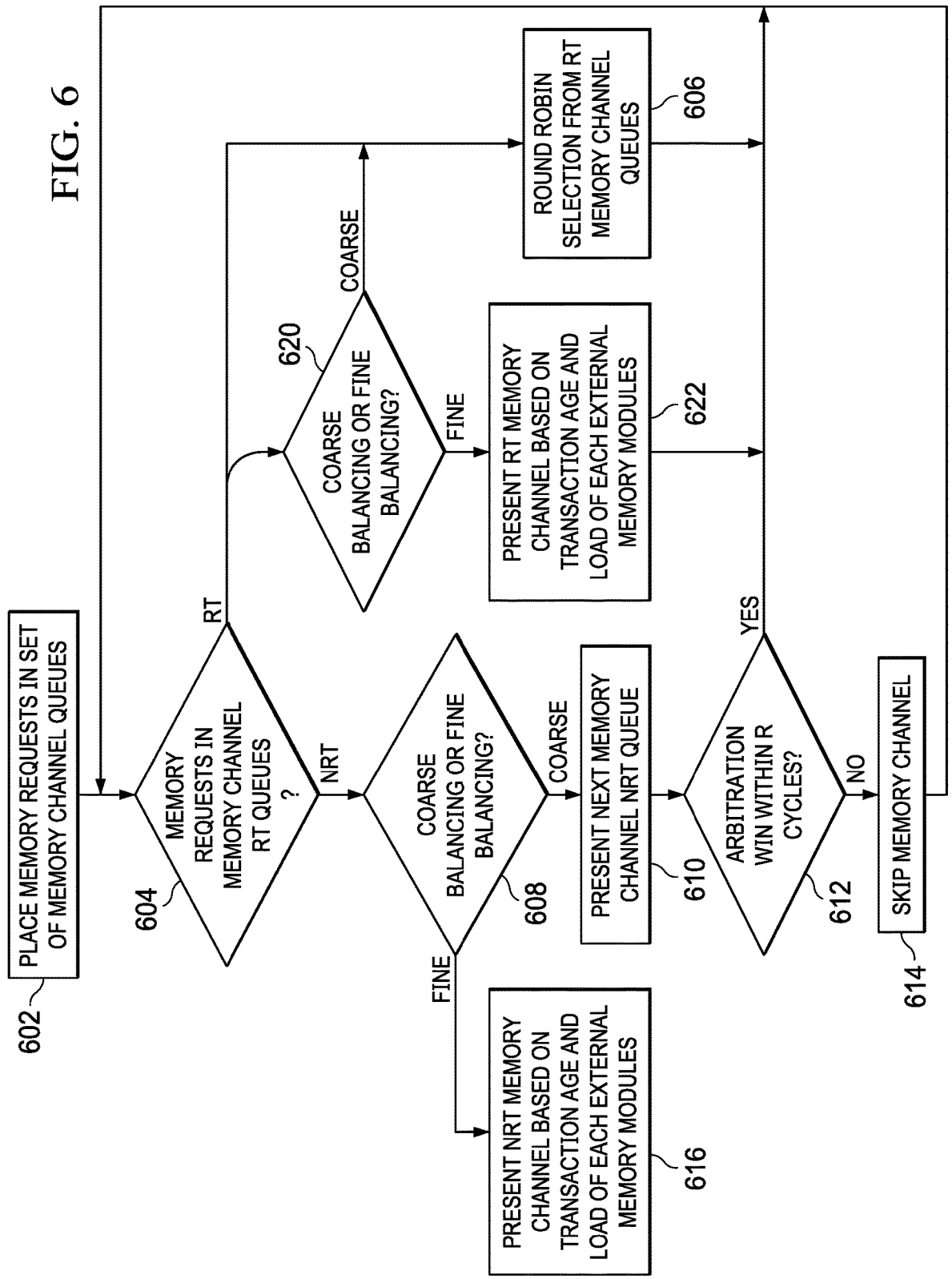
FIG. 6 is a flow diagram illustrating a technique for memory channel queue arbitration, in accordance with aspects of the present disclosure.

FIG. 6 is a flow diagram 600 illustrating a technique for memory channel queue arbitration, in accordance with aspects of the present disclosure. At block 602, memory requests may be placed in a set of memory channel queues. For example, an external interleave module may receive a memory request from a mastering peripheral and place one or more portions of the memory request in a memory channel queue corresponding to a particular memory channel and memory module. Arbitration as between the memory channel queues associated with the mastering peripheral may be performed after the memory request is placed in the memory channel queue. Memory requests may be placed into the memory channel queues independent of the arbitration process in the other blocks of FIG. 6. At block 604, the RT memory channel queues may be checked for memory requests. If the RT memory channel queues have memory requests, execution may proceed to block 606. At block 606, in some cases, a round robin selection for the RT memory channel queues may be performed. For example, the peripheral arbitration module may track which RT memory channel queue was previously selected and then select the next RT memory queue that has a memory request. The memory request from the selected RT memory queue may then be presented for arbitration by the external memory arbitration module. After the memory request is selected by the external memory arbitration module, execution may return to block 604.

In some cases, at block 604, if the RT memory channel queues have memory requests, execution may proceed to block 620. At block 620, if the peripheral arbitration module is configured to perform a coarse balancing arbitration algorithm for the RT memory channel queues, execution proceeds to block 606 as described above. If the peripheral arbitration module is configured to perform a fine balancing arbitration algorithm for the RT memory channel queues, execution proceeds to block 622. The fine balancing arbitration algorithm for RT memory channels may be substantially similar to the fine balancing arbitration algorithm for NRT memory channels described below.

At block 608 if the peripheral arbitration module is configured to perform a coarse balancing arbitration algorithm for the NRT memory channel queues, execution proceeds to block 610. If the peripheral arbitration module is configured to perform a fine balancing arbitration algorithm, execution proceeds to block 616. In some cases, the arbitration algorithm the peripheral arbitration module is configured to perform may be configurable, for example, by a user. In some cases, this configuration may be performed during a boot process and/or a reconfiguration process.

In some cases, the coarse balancing algorithm may be a round robin, heartbeat style arbitration algorithm to help bypass otherwise blocking memory requests. At block 610, the next NRT memory channel queue may be presented. For example, the peripheral arbitration module may track which NRT memory channel queue was previously selected and then select the next NRT memory queue that has a memory request. The next NRT memory queue may be based on a predefined pattern. If no NRT memory channel queue was previously selected, then a first NRT memory queue may be selected. After the last NRT memory channel is selected, then the next NRT memory queue may be the first NRT memory queue. The memory request in the selected NRT memory channel may be presented to the corresponding external memory arbitration module for a predefined number R of clock cycles. At block 612, if the presented memory request is accepted, for example by the external memory arbitration module, within R clock cycles then execution may proceed back to block 604. If the presented memory request is not accepted within R clock cycles, execution may then proceed back to block 604 and the next NRT memory queue is presented at block 610. For example, if the presented memory request is not accepted within a set number of clock cycles, then the presented memory request may be skipped, and the next NRT memory queue presented. The skipped memory requests may then be presented again after the peripheral arbitration module circles back after servicing the other NRT memory queues.

In some cases, the fine balancing algorithm may select a NRT (or RT) memory channel queue for presentation be based on a set of factors. These factors may include a load level of the external memory modules/memory channels and a length of time a memory request has been in a NRT (or RT) memory channel queue. For example, the external memory arbitration module may implement a credit-based arbitration system and the load level of the external memory modules/memory channels may be determined based on a number of credits available for each external memory module. Memory requests associated with external memory modules with a lower load, such as those having more available credits, may be more likely to be selected.

In some cases, the length of time that memory requests have been in a NRT (or RT) memory channel queue may be determined based on an age factor. The age factor may be implemented, for example, based on a latency counter for each memory request. The latency counter may be reset when the memory request is placed in the NRT (or RT) memory channel queue and incremented, for example, each clock cycle, when another memory request in the same NRT (or RT) memory channel queue is successfully arbitrated, when another memory request targeting the same external memory module/memory channel is accepted, etc. As another example, the age factor may be implemented using an order number which is set based on a total number of memory requests in the NRT (or RT) memory channel queues. This order number may be decremented as other NRT (or RT) memory requests are successfully arbitrated.

The fine balancing algorithm may select a NRT (or RT) memory channel queue for presentation based on combination of multiple factors. For example, the load level of an external memory module/memory channel may act as a filter such that memory requests targeting an external memory module/memory channel that is fully loaded (e.g., has no credits available) are not presented for arbitration. For external memory module/memory channel that are not fully loaded, the fine balancing algorithm may select a NRT (or RT) memory channel queue based on a combination of the age factor of a memory request at the head of the queue and the load factor of the target external memory module/memory channel associated with the NRT (or RT) memory channel queue. In some cases, the factors, such as the credits available and/or age factor, may be normalized, weighted, and/or otherwise processed to help make the different factors comparable.

In some cases, memory requests in the RT memory channel queues may preempt memory requests in the NRT memory channel such that if a memory requests is placed in one of the RT memory channel queues while arbitration is occurring for a NRT memory request, either with coarse or fine balancing, the NRT memory request may be withdrawn and the memory request in the RT memory channel queue is presented instead.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. Circuits described herein are reconfigurable to include additional or different components to provide functionality at least partially similar to functionality available prior to the component replacement. Modifications are possible in the described examples, and other examples are possible within the scope of the claims.

What is claimed is:

1. A device, comprising:
a set of memory modules accessible via a set of memory channels;
a memory controller; and
a peripheral coupled to the set of memory modules via the memory controller, wherein the memory controller comprises:
a set of memory channel queues, wherein memory channel queues of the set of memory channel queues correspond to memory channels to access the set of memory modules;
a first arbitration module; and
a second arbitration module;
wherein the memory controller is configured to:
receive memory requests from the peripheral;
place one or more portions of the received memory requests in the memory channel queues of the set of memory channel queues;
wherein the first arbitration module is configured to:
select an arbitration algorithm from among multiple arbitration algorithms;
select a memory channel queue based on the arbitration algorithm;
present the one or more portions of the received memory requests in the selected memory channel queue to the second arbitration module; and
output the presented one or more portions of the received memory requests based on a selection by the second arbitration module.

2. The device of claim 1, wherein the memory controller includes an arbitration control register, and wherein the first arbitration module is configured to determine the arbitration algorithm based on the arbitration control register.

3. The device of claim 1, wherein selecting the arbitration algorithm among multiple arbitration algorithms comprises selecting between a first arbitration algorithm and a second arbitration algorithm.

4. The device of claim 3, wherein the first arbitration algorithm comprises a round-robin arbitration algorithm.

5. The device of claim 3, wherein the second arbitration algorithm selects a memory channel queue based on a set of factors.

6. The device of claim 5, wherein the set of factors include a load level of the memory channel associated with the set of memory channel queues and a length of time a portion of the received memory requests have been in a memory channel queue.

7. The device of claim 1, wherein the first arbitration module is configured to operate on memory requests from the peripheral, and wherein the second arbitration module and is configured to operate with memory requests from multiple peripherals.

8. A method, comprising:
receiving a memory request from a peripheral;
placing one or more portions of the received memory request in a memory channel queue of a set of memory channel queues associated with the peripheral;
selecting the memory channel queue using an arbitration algorithm, wherein the memory channel queue is selected based on at least one of a load level of the memory channel associated with the set of memory channel queues and a length of time a portion of the received memory requests have been in a memory channel queue;
presenting the one or more portions of the received memory request in the selected memory channel queue to a second arbitration module for selection by the second arbitration module; and
outputting the presented one or more portions of the received memory requests based on the selection by the second arbitration module.

9. The method of claim 8, wherein the arbitration algorithm selects a memory channel queue based on both the load level of the memory channel associated with the set of memory channel queues and the length of time a portion of the received memory requests have been in a memory channel queue.

10. The method of claim 8, further comprising determining an arbitration algorithm, wherein determining the arbitration algorithm comprises selecting between a first arbitration algorithm and a second arbitration algorithm based on a value stored in an arbitration control register.

11. The method of claim 10, wherein the first arbitration algorithm comprises a round-robin arbitration algorithm, and wherein the second arbitration algorithm selects a memory channel queue based on a set of factors.

12. The method of claim 11, wherein the set of factors include a load level of the memory channel associated with the set of memory channel queues and a length of time a portion of the received memory requests have been in a memory channel queue.

13. The method of claim 12, further comprising:
determining that the presented one or more portions of the received memory request has been presented for more than a threshold number of clock cycles; and
withdrawing the presented one or more portions of the received memory requests based on the determination that the one or more portions of the received memory requests has been presented for more than the threshold number of clock cycles.

14. A memory controller comprising:
a set of memory channel queues, wherein memory channel queues of the set of memory channel queues correspond to memory channels to access a set of memory modules, and wherein the set of memory channel queues are associated with a peripheral;
a first arbitration module;
a second arbitration module; and
a register;
wherein the memory controller is configured to:
receive a first memory request from the peripheral;
place one or more portions of the first memory request in the memory channel queues of the set of memory channel queues;
wherein the first arbitration module is configured to:
determine an arbitration algorithm based on information in the register;
select a first memory channel queue based on the arbitration algorithm;

present the one or more portions of the first memory request in the selected first memory channel queue to the second arbitration module; and output the presented one or more portions of the first memory request based on a selection by the second arbitration module.

15. The memory controller of claim 14, wherein the register includes an arbitration control register, and wherein the first arbitration module is configured to determine the arbitration algorithm based on information in the arbitration control register.

16. The memory controller of claim 14, wherein determining the arbitration algorithm comprises selecting between a first arbitration algorithm and a second arbitration algorithm.

17. The memory controller of claim 16, wherein the first arbitration algorithm comprises a round-robin arbitration algorithm; and wherein the second arbitration algorithm selects a memory channel queue based on a load of the memory channels corresponding to the memory channel queues.

18. The memory controller of claim 17, wherein the determined arbitration algorithm is the second arbitration algorithm, and wherein the first arbitration module is further configured to withdraw the presented one or more portions of the first memory request based on the load of a memory channel corresponding to the selected first memory channel.

19. The memory controller of claim 14, wherein the set of memory channel queues includes a set of real-time memory channel queues corresponding to the memory channels and a set of non-real-time memory channel queues corresponding to the memory channels, wherein the first memory request is a non-real-time memory request, and wherein the memory controller is further configured to:

receive a second memory request from the peripheral, wherein the second memory request is a real-time memory request;

place one or more portions of the second memory request in the real-time memory channel queues;

select a second memory channel queue, wherein the second memory channel queue is included in the set of real-time memory channel queues, and wherein the set of real-time memory channel queues are prioritized before the set of non-real-time memory channel queues;

present one or more portions of the second memory request to the second arbitration module; and output the presented one or more portions of the second memory request when the presented one or more portions of the second memory request are selected by the second arbitration module.

20. The memory controller of claim 19, wherein the first arbitration module is further configured to withdraw the presented one or more portions of the first memory request to present one or more portions of the second memory request.

* * * * *